United States Patent [19]

Sturm

[11] Patent Number: 5,242,043
[45] Date of Patent: Sep. 7, 1993

[54] WORKPIECE MOUNTING PALLET

[75] Inventor: Anton Sturm, Denkendorf, Fed. Rep. of Germany

[73] Assignee: Giddings & Lewis GmbH, Am Neckar, Fed. Rep. of Germany

[21] Appl. No.: 906,515

[22] Filed: Jun. 30, 1992

[30] Foreign Application Priority Data

Jul. 6, 1991 [DE] Fed. Rep. of Germany ....... 4125961

[51] Int. Cl.⁵ ............................................. B65G 37/00
[52] U.S. Cl. ............................... 198/345.3; 198/465.3; 198/803.2
[58] Field of Search ............... 198/345.1, 345.3, 465.1, 198/465.2, 465.3, 803.01, 803.2, 346.1

[56] References Cited

U.S. PATENT DOCUMENTS

| 4,557,371 | 12/1985 | Yonezawa ....................... 198/803.01 |
| 4,583,631 | 4/1986 | Yonezawa et al. .............. 198/345.3 |
| 4,799,586 | 1/1989 | Kutzli et al. .................. 198/345.3 X |
| 5,018,617 | 5/1991 | Miyata et al. ..................... 198/346.1 |
| 5,078,254 | 1/1992 | Colonius et al. .................. 198/345.3 |

Primary Examiner—D. Glenn Dayoan
Attorney, Agent, or Firm—John R. Benefiel

[57] ABSTRACT

A workpiece pallet is disclosed with which it is possible to machine a number of different workpieces in a transfer line with a minimum of equipment. The workpiece pallet has several faces each having at least one clamping place to receive a workpiece. The main body is rotated to present a selected side in the stations to allow operations on workpieces clamped on that side.

11 Claims, 3 Drawing Sheets

WORKPIECE MOUNTING PALLET

BACKGROUND OF THE INVENTION

The invention relates to a workpiece mounting pallet for machining and assembly systems in which the pallet is transferred through one or more stations, and a method of palletizing workpieces for transfer through the machine.

In flexible machining and assembly systems and especially in transfer lines, an assortment of workpieces which are similar in kind is often machined by several stations which are linked by a transfer system. The stations are usually specially equipped to carry out particular machining or other operations. These operations can be assembly operations, cutting operations or other machining operations. In any case, each of the stations carries out a repetitive operation on the workpiece which is brought into the station by the transfer system and held fixed by a clamping mechanism.

The clamping mechanism in the station is not adjusted between cycles, requiring perfect functioning of the transfer line over quite a long period of time. This results in high demands, above all, on the clamping mechanism which must properly fix and lock the respective workpieces in the stations during the operation. All of the workpieces have to be positioned exactly within a close tolerance in relation to critical points, automatically and without supervision by staff. Also, particularly when it is a cutting operation that is to be carried out on corresponding surfaces to be machined, the clamping mechanism has to receive and absorb considerable reaction forces which occur as a result of the machining. It is imperative that the positioning of the respective workpiece be maintained to ensure the quality of the machined workpieces.

In order to take this into account and not to have to reposition and lock in every machining station a workpiece which may be of complicated design, it is standard practice to use workpiece pallets which have clamping places provided on them and which are firmly clamped to the workpiece and cyclically transferred through all the machining stations together with the workpieces. With workpieces clamped at a precise location on the workpiece pallet, only the workpiece pallets have to be positioned, fixed and locked in the stations.

In a manner known per se, the transfer line comprises for this purpose supporting rails which are arranged on a fixed bed and on which the workpiece pallets are cyclically transferred in the advancing direction by transfer bars or other similarly operating drive means arranged between the supporting rails. For this purpose, the transfer bars which execute a lift and carry movement are periodically brought by positive or frictional connection into engagement with the workpiece pallets.

In the machining stations, fixing means, for example, locating pins are arranged in or on the supporting rails to align the respective workpiece pallet in a precisely defined position and fix it in both the advancing direction and the lateral direction in relation to the latter. The workpiece pallet is locked in this position by means of clamping jaws.

Adaptation of the transfer line to different workpieces without causing a serious disturbance in the production process can only be carried out by changing the workpiece pallets or converting these accordingly. However, a precondition for the changing of the workpiece pallets to correspond to the workpieces to be machined is that at least one specially designed workpiece pallet be held ready for each workpiece type. Owing, on the one hand, to the high accuracy requirement for the clamping of the workpieces on the workpiece pallets with long-time stability and, on the other hand, to the high reaction forces to be absorbed by the workpiece pallets, the workpiece pallets to be held in readiness are elaborate and expensive, and their cost increased by the need for their storage.

For the aforesaid reasons, various workpiece pallets have been developed to be convertible to be used for different workpiece types. Heretofore, such conversion possibilities have resulted in complicated and costly workpiece pallets.

For example, in the manufacture of clevis joint parts for motor vehicles, clevis joint parts of different dimensions have to be machined in the same transfer line, and it is often different clevis joint parts that are to pass through the machining stations immediately one after one the other in the machining sequence. The object is to be able to machine clevis joint parts in the transfer line without having to reequip the machining stations each time.

German patent 39 40 635 discloses a workpiece pallet as a workpiece carrier in production or assembly systems for the selective supporting of cylinder blocks of in-line or V-engines. For this purpose, a single clamping place is provided on the top surface of the workpiece pallet. A total of five stop rails extending parallel to one another are provided as support means on a concentric circle about an axis marked by the crankshaft bore. Two stop rails, in each respective case, which are not adjacent to one another and are separated by a stop rail located between them are allocated to one another and provided for positioning on a transfer system. The workpiece pallet can thus be placed on the transfer system in three rotated positions, turned about the horizontal axis marked by the crankshaft bore.

The workpiece pallet is specially provided for the production of cylinder blocks of V- or in-line engines. Accordingly, it has only one clamping place for two cylinder block types selectively. Owing to the arrangement of the stop rails on the above-described circle, accessibility to the workpiece is limited.

Also known in practice are workpiece pallets which have a main body with a rectangular base area and a pentagonal cross-section which can be placed on a transfer system. Adjoining the base areas, which is provided with holding and fixing devices for cooperation with the transfer system, are side surfaces which stand perpendicular on both sides of the base area and pass into inclined side surfaces. The inclined side surfaces border on a cover area which extends parallel to the base area and on which clamping places are provided for workpieces. Clamping jaws for fixing the workpieces in a machining position are arranged immediately beside the clamping places. Supporting rails and fixing bores are provided as holding and fixing devices on the base area of the workpiece pallet. Further devices for actuating the clamping jaws and for adjusting the clamping places are arranged inside the pallet.

Conversion of the workpiece pallet from one workpiece type to another, if provided at all, is costly and time consuming. Consequently, with quite a large assortment of workpieces to be machined, a corresponding supply of workpiece pallets has to be held ready. As the workpiece pallets are relatively expensive, the cost for the workpiece pallets alone and the necessary storage is considerable. A further disadvantage is that the number of clamping places arranged on the cover area is rather small.

Furthermore, so-called clamping cubes which have a right parallelepiped main body with a square main and covering area are used in practice for supporting workpieces in machine tools. The main area is provided with connection means to enable the clamping cube to be rigidly coupled to a rotatable workpiece table. Clamping means for attachment of smaller workpieces which are to be machined one after the other are provided on the side faces of the clamping cube. To selectively bring the workpieces clamped on a selected side face into the machining position, the workpiece table is turned together with the rigidly coupled clamping cube about an axis which stands perpendicular on the main area of the clamping cube.

This clamping cube is not suitable for use in transfer lines and cooperation with a transfer system.

Therefore, the object of the invention is to create a low cost workpiece pallet with which it is possible to perform machining or other operations on different workpieces in a transfer line.

SUMMARY OF THE INVENTION

This object is accomplished in accordance with the invention by a main body constituting the workpiece pallet, formed with a circumferential array of workpiece mounting surfaces extending about its longitudinal axis. Each surface is also provided with features able to cooperate with the transfer system so that the body is able to be variously oriented with respect to the transfer system so as to workpieces clamped on a given surface for operations in the stations.

One or a series of clamping features are arranged on each surface. The array of surfaces of the body form a polygonal cross-section enclosing the longitudinal axis. The workpieces clamped on the clamping fixtures are arranged so as to be located radially outwardly in relation to the longitudinal axis of the workpiece pallet. This makes them particularly easily accessible and easy to machine.

If the polygonal shape characterizing the cross-section of the main body is of equilateral design, all of the side faces can be identical design and there is exactly the same amount of space available for all of the clamping features.

Adjustment and locking devices are arranged at the corners of the workpiece mounting surfaces, adapted to cooperate with the transfer system so that the workpiece pallets can be automatically fixed and locked in an accurate and simple manner.

For this purpose, the adjustment and locking devices can advantageously comprise at least one supporting surface aligned parallel to the mounting surface and at least one clamping surface arranged in parallel relation to it. The supporting surfaces are provided for guiding support on supporting rails of the transfer system. The clamping jaws for locking the workpiece pallet are positioned and clamped firmly against the clamping surface and the supporting surfaces are thereby clamped firmly against the supporting rails.

The mounting surfaces of the main body define essentially a right parallelepiped with square cross-section. Hence the mounting faces are not only identical in size, but, in addition, extend in pairs at right angles to one another. Therefore, the mounting surfaces of the workpiece pallet always stand either vertically or horizontally. In this way simple geometrical relations are created.

In the region of the corners formed by the intersecting mounting surfaces, the main body comprises grooves or recesses extending longitudinally in which the adjustment and locking devices are arranged. In an advantageous manner, each adjustment and locking device comprises two stop rails at right angles to one another and two auxiliary stops arranged in the linear extension which protrude partly over the side faces. With this measure, the supporting surfaces and the clamping surfaces are provided in stop rails which are simple to manufacture and just as simple to adjust.

The above-described design enables placing of the workpiece pallet on the supporting rails in various positions, with safe supporting of the workpiece pallet on the supporting rails thereby being guaranteed. Clamping jaws can engage the stop rails and auxiliary stops protruding over the side faces. The workpiece pallet is thereby safely locked during machining of the workpieces.

A particularly space-saving solution is obtained when the adjustment and locking devices comprise locating bores for receiving locating pins.

For machining a larger number of workpieces, it is advantageous for a linear array of clamping fixtures for identical workpieces to be provided on each mounting surface of the workpiece pallet. If the machining stations of the transfer line are designed accordingly, all of the workpieces clamped on each side of the workpiece pallet can then be machined in one work sequence.

It is advantageous for the clamping fixtures to be so arranged on the mounting surfaces that the spacings of the clamping fixtures from the associated locating bores are identical for all of the mounting surfaces and for the clamping fixtures to be arranged such that when the workpiece pallet is taken off, turned and placed on the supporting rails against, the workpieces exchange their positions exactly. The workpieces on all of the mounting surfaces can then be brought into the machining position by rotating the workpiece pallet about its longitudinal axis without the machining stations having to be adjusted for this purpose.

DESCRIPTION OF THE DRAWINGS

An embodiment of the invention is illustrated in the drawings, in which.

DETAILED DESCRIPTION

Figure 1:
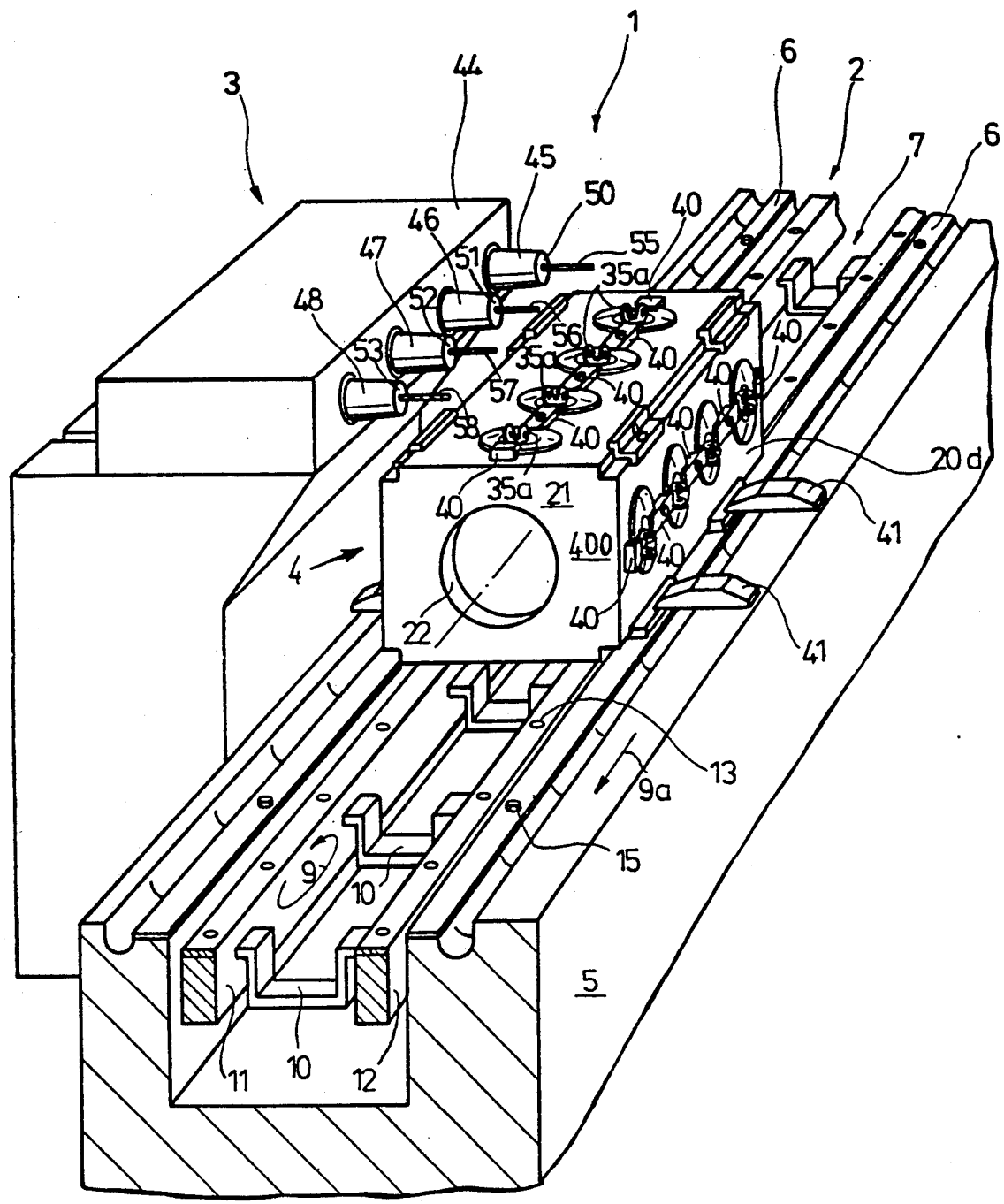
FIG. 1 is a perspective view of a section of a transfer line with a plurality of machining stations, only one of which is illustrated, and an workpiece pallet fixed in the machining station with workpieces clamped on it.

The transfer line 1 shown in partial section in a perspective illustration in FIG. 1 comprises a transfer system 2 and several machining stations 3, only one of which is shown by way of example for several different machining stations which are each equipped for special machining operations. Several workpiece pallets 4 of essentially right parallelepiped shape are placed on the transfer system 2 and one of these is shown fixed in the machining position in FIG. 1.

A bed 5 belonging to the transfer system with two supporting rails 6 arranged in spaced parallel relation to one another is provided for supporting and guiding the workpiece pallet 4. A transfer bar 7 provided between the supporting rails 6 parallel to these is driven by a drive system, not illustrated, to execute a lift and carry movement in the manner indicated by arrow 9 and to impart to the workpiece pallets 4 placed thereon an advancing movement in a transfer direction 9a. The transfer bar 7 is of two-part design and comprises two beams 11, 12 joined by crosspieces 10.

Figure 2:
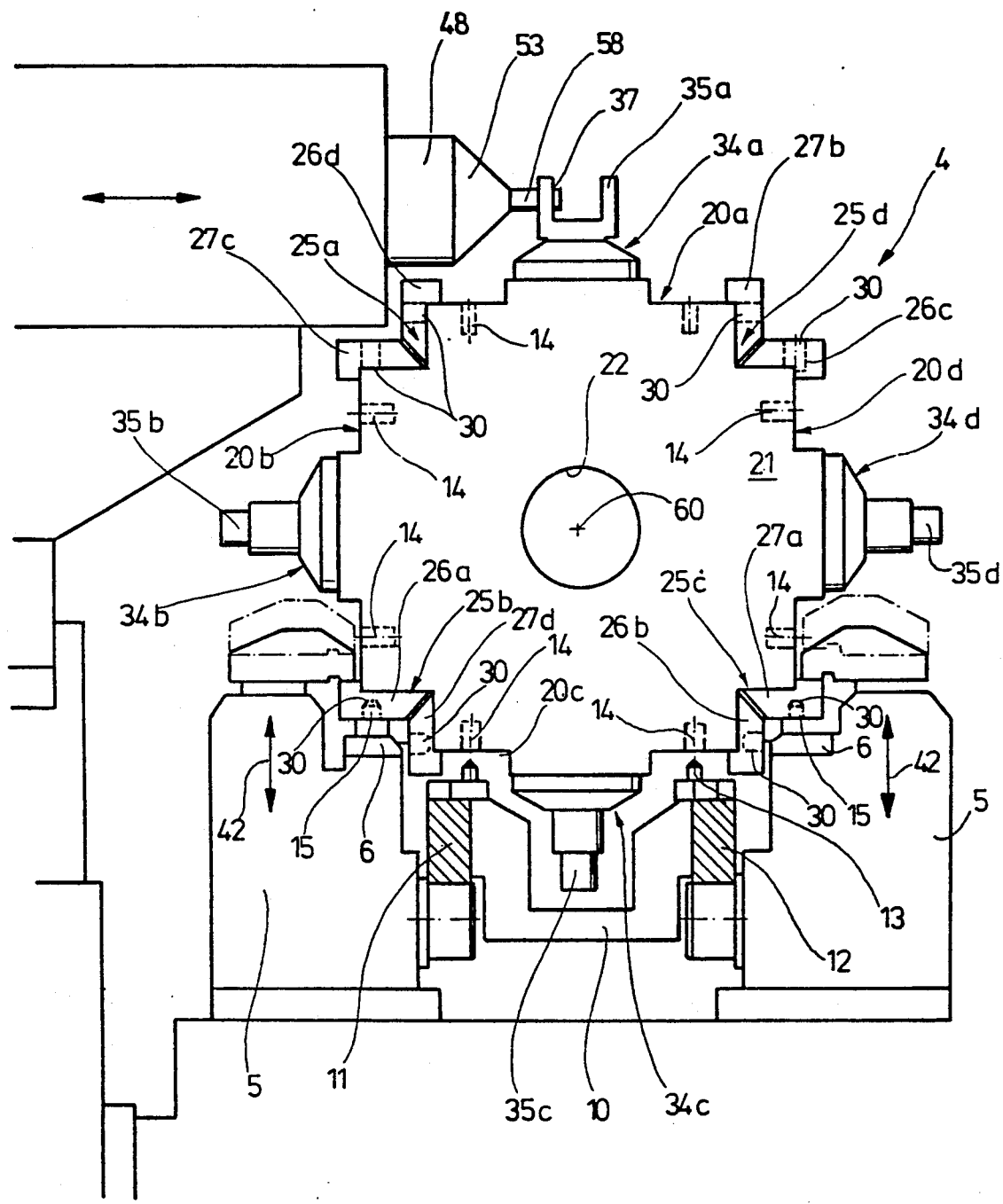
FIG. 2 is an end view in the transfer direction of the workpiece pallet according to FIG. 1 in the machining station with associated portions of the machining station, clamping mechanism and transfer guides.

As best seen in FIG. 2, each of the beams 11, 12 is provided with locating pins 13 for temporary positive connection of the respective beam 11, 12 with the workpiece pallet 4 via locating bores 14 provided on the workpiece pallet 4. As is also apparent from FIG. 2, fixed or movable locating pins 15 are vertically arranged on the horizontal supporting rails 6 and extend through these.

The workpiece pallet 4 comprises a one- or multi-part main body 400 with a circumferential array of four workpiece mounting surfaces 20 of identical size, each lying in an orthogonal plane 19a–d (FIG. 2) and two square end faces 21 which are each provided with an opening 22.

Figure 3:
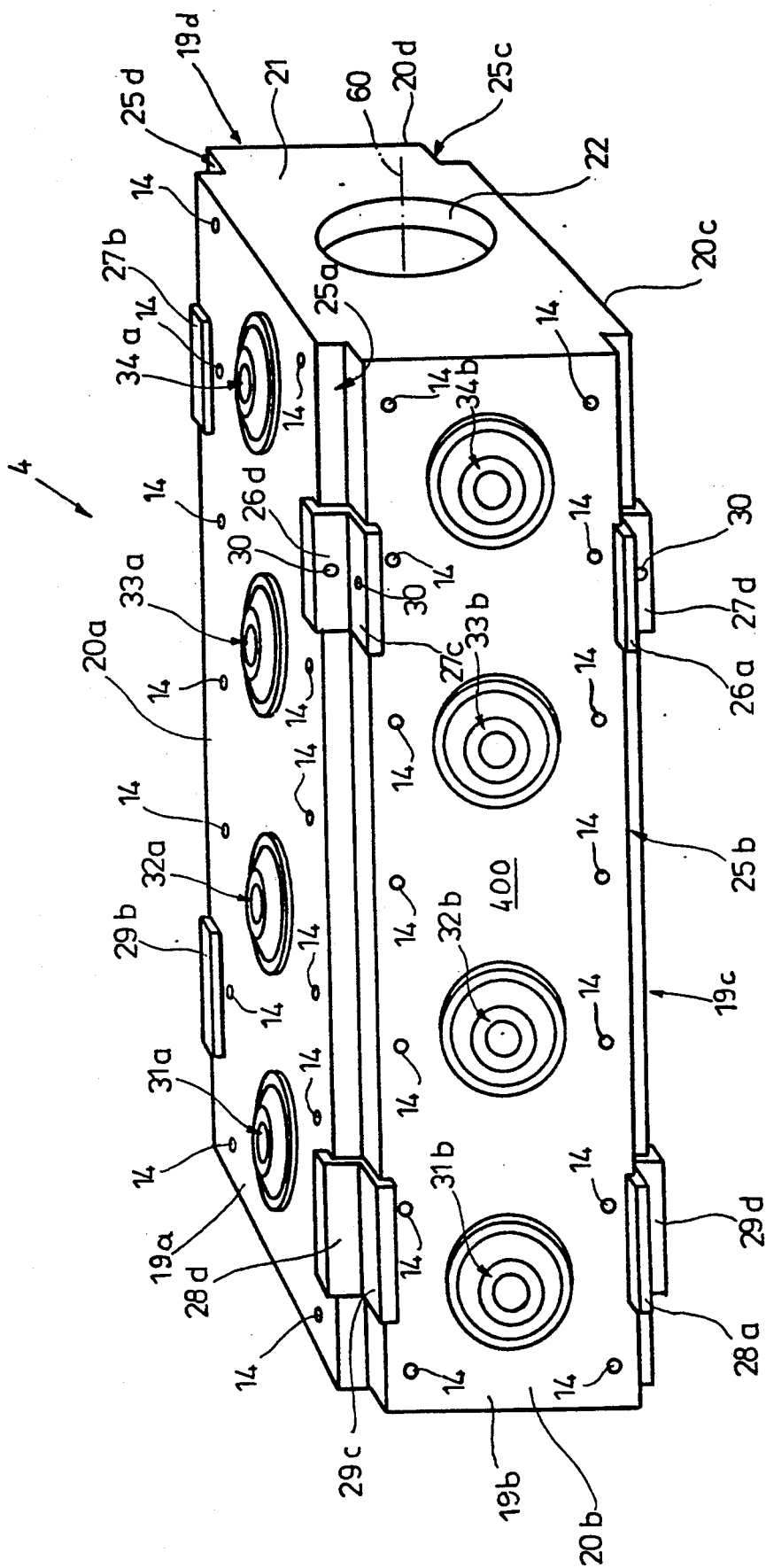
FIG. 3 is a perspective view on a different scale of the workpiece pallet shown in FIG. 1 without workpieces.

In FIG. 2, a mounting surface 20a is arranged at the top, a mounting surface 20b at the left, a mounting surface 20c at the bottom and a mounting surface 20d at the right. The cross-section is described by the planes 19a–d, longitudinally extending right angled recesses 25a–d are provided at each corner of the main body 40 at which the mounting surfaces 20a–d intersect each another. Stop rails 26a–d, 27a–d intersect each another. Stop rails 26a–d, 27a–d extending at an angle of 90° in relation to one another are arranged for individual adjustment in each of the grooves 25a–d. Also arranged in the grooves 25a–d flush with the stop rails 26a–d, 27a–d are adjustable auxiliary stops 28a–d, 29a–d which are oriented at right angles to one another. These are covered in FIG. 2 and partly visible in FIG. 3.

The stop rails 26, 27 and auxiliary stops 28, 29 designated by the identification letters a–d are respectively allocated to the mounting surface 20 with the same identification letter and are aligned in the groove 25 opposite the pertinent mounting surface 20 parallel to the side face 20. For example, the stops rails 26a, 27a and the auxiliary stop 28a, 29a are allocated to the mounting surface 20a. The stop rails 26a–d, 27a–d and the auxiliary stops 28a–d, 29a–d protrude slightly over the respectively adjacent mounting surfaces 20a–d. For precise indexing of the workpiece pallet 4 into machining positions, locating bores 30 are provided in the stop rails 26a–d, 27a–d for receiving the locating pins 13 projecting vertically upwards out of the supporting rails 6.

The mounting surface 20a is provided with a longitudinal series of four clamping fixtures 31a, 32a, 33a, 34a for workpieces 35a. If required, more, for example, six clamping places or fewer clamping fixtures can, of course, also be provided. The clamping fixtures 31a–34a are preferably arranged in a line lying longitudinally in relation to the transfer direction 9a at the center of the mounting surface 20a. In accordance with this, each of the mounting surfaces 20b–d comprise clamping places 31b–d, 32b–d, 33b–d, 34b–d likewise respectively arranged in a row for workpieces 35b–d. In order to arrange the machining points 37a–d provided on the workpieces 35a–d in a position which coincides on all mounting surfaces 20a–d in relation to the index bores 30, the clamping fixtures 31–34 are arranged on each mounting surface 20 of the workpieces pallet 4 such that the spacing of the clamping fixtures 31–34 from the respectively associated index bores 30 is always identical along the longitudinal transfer direction 9a. By this arrangement, exact indexing of the workpiece pallet 4 and location of the workpieces 35 clamped on the clamping places 31–34 are achieved. Clamping jaws 40 are provided for clamping the workpieces 35 on the respective clamping fixtures 31–34. The clamping jaws 40 and the clamping fixing fixtures 31–34 are designed in accordance with the workpieces 35 to be clamped so that the individual workpieces 35 can be clamped in the correct position and in the same way. The stop rails 26, 27, 28, 29 are individually adjustable for exact adjustment of the workpiece pallet 4.

The position of the workpiece pallet 4 is fixed at the machining stations by the locating pins 15. To achieve a defined position for the workpiece pallet 4 during the machining of the workpieces 35 clamped there on, automatically actuated clamping jaws 41 are provided on the transfer system. The clamping jaws 41 are movable in the vertical direction 42 and are transferrable from a releasing position illustrated in dot-and-dash lines to a clamping position. In the latter, the clamping jaws are fixedly positioned on the stop rails 26a, 27a protruding over the mounting surfaces 20b, d to lock the workpiece pallet 4.

The workpiece pallet 4 thus locked on the transfer system 2 is illustrated at the machining station 3 in FIG. 1. To machine the workpieces 35a clamped on the clamping fixture 31a–34a on the top mounting surface 20a, the machining station 3 comprises work spindles 45–48 arranged on a common slide 44 with tool heads 50–53 in which tools 55–58 are held. The positions of the tool heads 50–53 correspond exactly to the positions of the clamped workpieces 35a so that all are machined simultaneously. To bring the tools 55–58 into engagement with the workpieces 35a, the slide 44 carries out an advancing motion with the work spindles 45–48. In this case, the same machining operation is carried out simultaneously on all workpieces 35a; after completion of the machining operation, the workpiece pallet 4 is released by the clamping jaw 41 and indexed by the transfer system 2 to the next machining station. Machining stations with fewer work spindles, for example, only one work spindle can, of course, also be provided on the transfer line. At such machining stations, the workpieces 35 are machined in sequence one after the other. In this case, the workpiece pallet 4 is locked during the respective machining operation and then indexed further at the given time.

The mode of operation and function of the workpiece pallet described so far will be explained in further detail hereinbelow: As is already evident from the above-description, the workpiece pallet 4 is of essentially identical design on all four mounting surfaces 20a–d with respect to the clamping fixtures 34a–d, the stop rails 26a–d, 27a–d and the auxiliary stops 8a–d, 29a–d. Consequently, the workpiece pallet 4 can be the placed on the supporting rails 6 of the transfer system 2 in any of four positions, each rotated 90° in relation to a longitudinal axis 60 extending parallel to the transfer direction 9a and indexed, by these to the machining stations 3 in accordance with the machining sequence. The mounting surface 20 of the workpiece pallet 4 on which the clamping 31a-34a suitable for the workpieces 35a are arranged then points upwards.

At the start of the machining, the workpiece pallet 4 is then raised by the transfer bar 7 and lifted off the supporting rails 6, carried in the transfer direction through a predetermined indexing distance and set down on the supporting rails 6 in sequence. In the machining station 3, the locating pins 15 engage in the index bores 30 and fix the workpiece pallet 4. The clamping jaws 41 are positioned on the stop rails 26a-27a and the auxiliary stops 28a, 29a and the workpiece pallet 4 is thereby locked on the supporting rails 6 of the transfer system 2.

By an advancing movement of the slide 44 which is provided with the work spindles 45-48, the tools 55-58 are brought into engagement with the workpieces 35a and the intended machining operation is carried out. After its completion, the clamping jaws 41 release the workpiece pallet 4 and the transfer system 2 indexes the workpiece pallet 4 to the next machining station 3.

If other workpieces 35b are to be machined in the transfer line 1, the workpiece pallet 4 is lifted off the supporting rails 6, turned through 90° about the longitudinal axis 60 in the clockwise direction in FIG. 2 so that the side face 20b points upwards with the clamping places 31b-35b and is set down on the supporting rails 6 against in this position. After the mounting of the workpieces 35b, the machining operations are carried out in the transfer line 1 in the manner described hereinafter for the workpieces 35a.

In order to shorten the work sequence, the workpiece pallet 4 can also be equipped at the beginning of the machining with workpieces 35a-d on several or also on all side faces 20a-d and the corresponding mounting surfaces 31a-34d. Owing to the two-part construction of the transfer bar into the beams 11, 12 and the offset design of the connection crosspieces 10, there is sufficient space even for the workpieces 35c clamped on the clamping places 31c-34c located between the supporting planes 6 to ensure unimpeded synchronous transfer of the workpiece pallet 4. Workpieces 35b, d can also be readily clamped on the mounting surfaces 20b, d standing perpendicular in FIGS. 1 to 3 without the access of the tools 55-58 to the workpieces 35a being impeded.

When machining on the workpieces 35a clamped on the mounting surfaces 31a-34a of the mounting surface 20a has been completed, the workpiece pallet 4 is turned about the longitudinal axis 60. It then travels through the transfer line again with the workpieces 35b now pointing upwards. This procedure is repeated until machining of all the workpieces 35a-d clamped on the workpiece pallet 4 has been completed.

As the clamping fixtures 31a-34d can be designed for different workpieces, only a single workpiece pallet 4 is required for four different workpieces 35a-d. This can be selectively equipped fully or partly. Conversion of the transfer line 1 is not necessary when the workpiece pallet 4 is used for machining different workpieces 35a-d. The number of workpiece pallets 4 to be held in readiness for different workpieces 35a-d is small, which drastically reduces the cost for the workpiece pallets and the costs involved in keeping the workpiece pallets 4 in readiness.

I claim:

1. A transfer line including at least one workstation having means for performing operations on one or more workpieces, a series of workpiece holding pallets, a station locating and clamping mechanism for locating and clamping each of said pallets in said station, and a transfer system including drive components adapted to engage each of said pallets and successively transfer each pallet in a transfer direction so as to successively transfer each of said pallets into said workstation, said pallets each comprising:

a main body adapted to be engaged by said transfer system drive components, said main body having a longitudinal axis extending in said transfer direction when engaged by said transfer system drive components;

said main body having a circumferential array of workpiece mounting surfaces distributed circumferentially around said longitudinal axis to form a generally polygonal cross sectional shape, at least one clamping fixture associated with each mounting surface for receiving and securing a workpiece thereto;

a circumferential array of sets of transfer system and station locating and clamping mechanism engaging features on said main body separate from said clamping fixture, each set of features associated with a respective mounting surface distributed circumferentially around said longitudinal axis of said main body, each set of features adapted to be engaged by said transfer system and station drive components in respective rotated positions of said main body about said longitudinal axis thereof.

2. The transfer line according to claim 1 further including a linear series of clamping fixtures extending longitudinally in said transfer direction along each of said workpiece mounting surfaces of said main body, whereby a plurality of workpieces can be mounted along each mounting surface in said transfer direction.

3. The transfer line according to claim 2 wherein each of said linear series of clamping fixtures is identically configured.

4. The transfer line according to claim 1 wherein each of said sets of said transfer system and station locating and clamping mechanism features is located along a respective longitudinal side of each of said mounting surfaces of said main body.

5. The transfer line according to claim 1 wherein each of said mounting surfaces and each of said series of clamping fixtures are identically configured.

6. The transfer line according to claim 1 wherein said polygonal shape comprises a square and said mounting surfaces are each generally rectangular in shape.

7. The transfer line according to claim 4 wherein a recess is formed along each longitudinal side of each of said mounting surfaces, each recess having a station locating and clamping engaging features mounted therein.

8. The transfer line according to claim 7 wherein said station locating and clamping mechanism engaging features each comprise a stop rail and an auxiliary stop longitudinally spaced fixed along each recess extending along each longitudinal side of each mounting surface of said main body, each of said rails protruding past said respective associated mounting surface to be engagable with a clamping mechanism, and a bore extending into each stop rail engagable with a locating pin at said station.

9. The transfer line according to claim 1 wherein said transfer system engaging features comprise bores extending into each mounting surface of said main body.

10. The transfer line according to claim 1 in combination with a transfer system including a transfer bar including a pair of parallel rails interconnected with connecting pieces, and wherein said connecting pieces are offset to create a clearance allowing workpiece clamping fixtures with workpieces mounted therein to be positioned facing down on said parallel rails with said workpieces disposed therebetween.

11. A method of palletizing any of a series of variously configured workpieces for transfer between stations in a multistation machine by a transfer system for performing operations on a selected configuration of said series of variously configured workpieces in each of said stations, comprising the steps of:

providing clamping fixtures on each side of a polygonally shaped main body to provide a workpiece pallet, said clamping fixtures on each side of said main body each adapted to receive a respective workpiece configuration;

rotating said main body about a longitudinal axis extending parallel to said main body sides during installation of said main body in said transfer system so as to be oriented to present the side of said main body in each station which is adapted to mount a workpiece of a particular selected configuration to be operated on; and transferring said main body through said stations with said main body in said orientation to enable said operations to be performed on said particular selected workpiece configuration.

* * * * *